(12) United States Patent
Cour

(10) Patent No.: US 7,928,700 B2
(45) Date of Patent: Apr. 19, 2011

(54) METHOD AND DEVICE TOLERANT TO DIRECT CURRENT SOURCE FLUCTUATION FOR PULSE CHARGING A BATTERY

(76) Inventor: Jean-Michel Cour, Orsay (FR)

(*) Notice: Subject to any disclaimer, the term of this patent is extended or adjusted under 35 U.S.C. 154(b) by 403 days.

(21) Appl. No.: 10/593,825

(22) PCT Filed: Mar. 22, 2005

(86) PCT No.: PCT/EP2005/003059
§ 371 (c)(1),
(2), (4) Date: Sep. 22, 2006

(87) PCT Pub. No.: WO2005/091462
PCT Pub. Date: Sep. 29, 2005

(65) Prior Publication Data
US 2007/0222411 A1    Sep. 27, 2007

(30) Foreign Application Priority Data
Mar. 23, 2004    (FR) .................................... 04 03012

(51) Int. Cl.
*H02J 7/04* (2006.01)
*H02J 7/00* (2006.01)

(52) U.S. Cl. ........ 320/166; 320/137; 320/138; 320/139; 320/124; 320/167; 320/148

(58) Field of Classification Search ............... 320/101, 320/166, 165, 129, 134, 135, 136, 137, 138, 320/139, 148, 149, 160, 161, 162, 167
See application file for complete search history.

(56) References Cited

U.S. PATENT DOCUMENTS

| 685,958 | A | | 11/1901 | Tesla |
| 5,747,967 | A | | 5/1998 | Muljadi et al. |
| 5,811,958 | A | * | 9/1998 | Yamamoto ................. 320/101 |
| 6,157,165 | A | * | 12/2000 | Kinoshita et al. ............ 320/116 |
| 2003/0117111 | A1 | | 6/2003 | Bedini |

FOREIGN PATENT DOCUMENTS

| DE | 93 09 287 | 8/1993 |
| DE | 196 17 397 | 11/1997 |
| EP | 0 268 338 | 5/1988 |

* cited by examiner

*Primary Examiner* — Edward Tso
*Assistant Examiner* — Alexis Boateng
(74) *Attorney, Agent, or Firm* — Young & Thompson

(57) ABSTRACT

A method for charging a battery (16) from a direct-current source liable to significant fluctuations, which includes the steps of:
- progressively charging a storage capacitor (14) at a voltage that is higher than the nominal voltage of the battery (16),
- detecting a predetermined voltage threshold over the terminals of the storage capacitor (14), and
- discharging the storage capacitor (14) into the battery (16), the discharging being controlled by the threshold detection.

10 Claims, 3 Drawing Sheets

METHOD AND DEVICE TOLERANT TO DIRECT CURRENT SOURCE FLUCTUATION FOR PULSE CHARGING A BATTERY

INVENTION DOMAIN

The invention aim is of a process and device for charging a battery specifically adapted to any primary energy source that can exhibit slow or fast fluctuation of the available power.

It allows various sources of un-stabilized direct current though providing a constant quality of charge according to the technique of current pulsing from a switched capacitor.

A typical application of the invention is charging from a photovoltaic cells source.

STATE OF THE ART

The method of transferring electrical energy by means of a switched capacitor is not new. This is known since the early Nikola Tesla's U.S. Pat. No. 685,958 (1901, 5 Nov.).

According to this method, one waits until an electric energy source has charged a capacitor up to a predetermined level for allowing the stored energy to flow to a charge by means of a switching device.

A plurality of methods are known as well for changing a direct current voltage by means of transformers or switched capacitors, such as the <<Villard>> voltage multiplier. The generic naming for devices operated according to such methods is: direct current/direct current converters or DC/DC as an acronym.

The provisional patent application by John Bedini (US 2003/0117111 A1, Jun. 26, 2003) is based on a capacitor which is periodically charged from some DC/DC converter up to a voltage greater than the battery voltage, and then discharged as a pulse into the battery.

It is our understanding that this purely periodic method is not new in itself since it juxtaposes in an obvious fashion the cited Nikola Tesla's invention and the well known process of periodically pulse battery charging.

It should be noticed that Bedini's method claim 1 provides a characteristic step of disconnecting the capacitor from the source at discharge time, this step being un-necessary within the present invention.

Furthermore, the periodic nature of the capacitor discharge according to Bedini is not tolerant to substantial source fluctuations, while the present invention is based on a non periodic method of capacitor charging and triggering the discharge that automatically self adapts to such fluctuations.

DESCRIPTION

The invention shall be described based on FIGS. 1 to 4.

Figure 1:
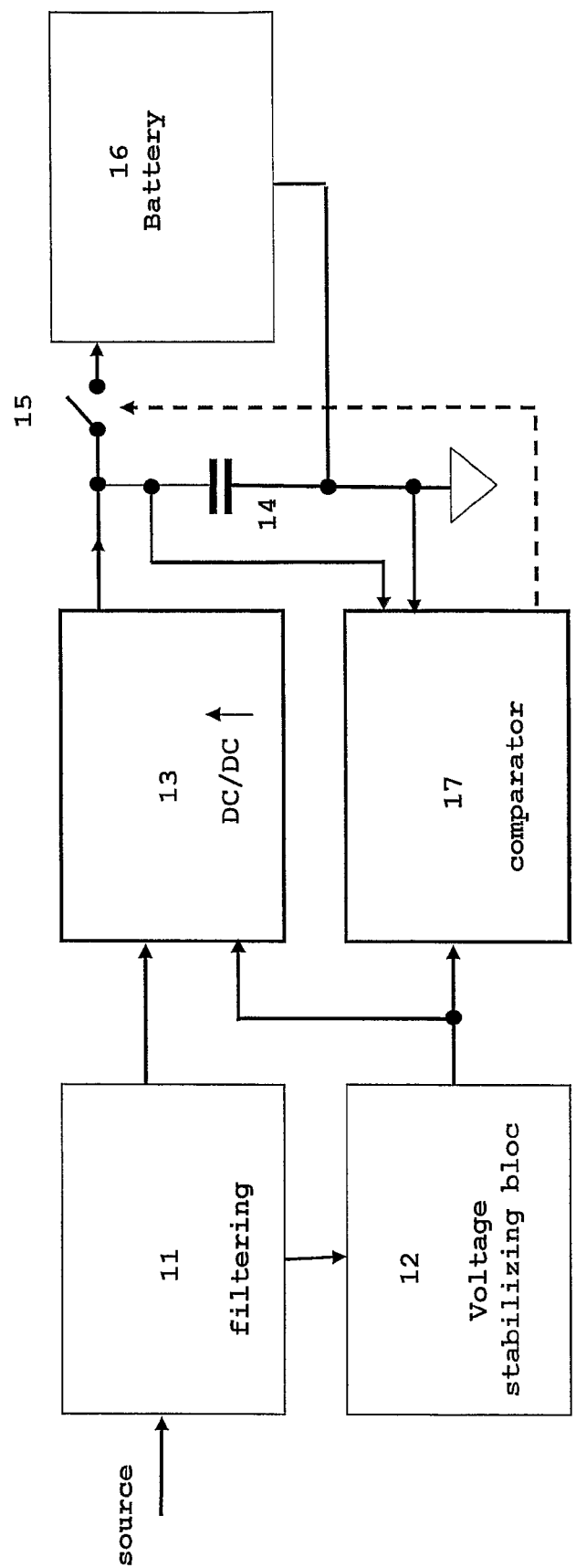
FIG. 1 shows a block diagram of a charger according to the invention, exhibiting the fluctuating source tolerant step charging device together with the comparator and discharge triggering device, those two devices being the essential modules in the invention.

According with FIG. 1, a charger using the invention method splits into:
- a rough filtering block (11) useful for such fast fluctuating direct current power sources as a photovoltaic panel,
- a voltage stabilizing block (12) suitable for providing stable voltage to the charger control logic parts,
- a DC/DC conversion stage (13) suitable for step charging a storage capacitor (14) up to a predetermined energy level though tolerating fluctuations of the source,
- a controlled switch (15) suitable for discharging the capacitor (14) into the battery (16),
- a comparator device (17) that triggers the switch (15) as soon as the predetermined level of energy is attained.

According to the invention, the source may exhibit substantial fluctuations without compromising the quality of the battery charge.

A first example of such fluctuation can be of changing the direct current primary source.

So, such a charger input may be indifferently hooked to:
- various battery types within a large range of nominal voltage and capacity,
- various types of "adapters" (rectifiers) operated from the mains AC current, and not necessarily stabilized,
- various types of photovoltaic cells.

Charging a battery from a <<panel>> assembly of photovoltaic cells is an especially attractive application of the invention.

It is well known that a photovoltaic cell behaves as a constant current source under a constant light flow level, but exhibits significant fluctuations when the light flow varies on short or long term condition (time of day, orientation, moisture). The description thereafter shows how the charger reacts quite instantly to such variations of the available input power.

Bicycle lighting—an obvious safety issue—is another typical application of the invention.

Conventional bicycle lighting systems use a so-called "dynamo" (that is, a small size alternator) to directly power front and back lights. This "dynamo" is by essence a very fluctuating source, so that the user has poor or no light at low speed.

A well-known alternative is to power the bicycle lights from batteries, allowing continuous lighting regardless of the speed. Conversely the user has the burden of changing or charging the batteries in due time; otherwise, batteries exhaustion results in no lighting at all.

The best of both systems can be achieved by means of the invention. By means of a well known diode full bridge rectifier or by means of a well-know diodes and capacitors voltage multiplier, the "dynamo" will source fluctuating DC current.

In turn, the charger shall be hooked to the lamp batteries therefore compensating the lamp consumption and/or charging those batteries depending on the instant speed.

The bicycle user thus benefits from both an autonomous energy source (the "dynamo") and a continuous lighting (from batteries).

Figure 2:
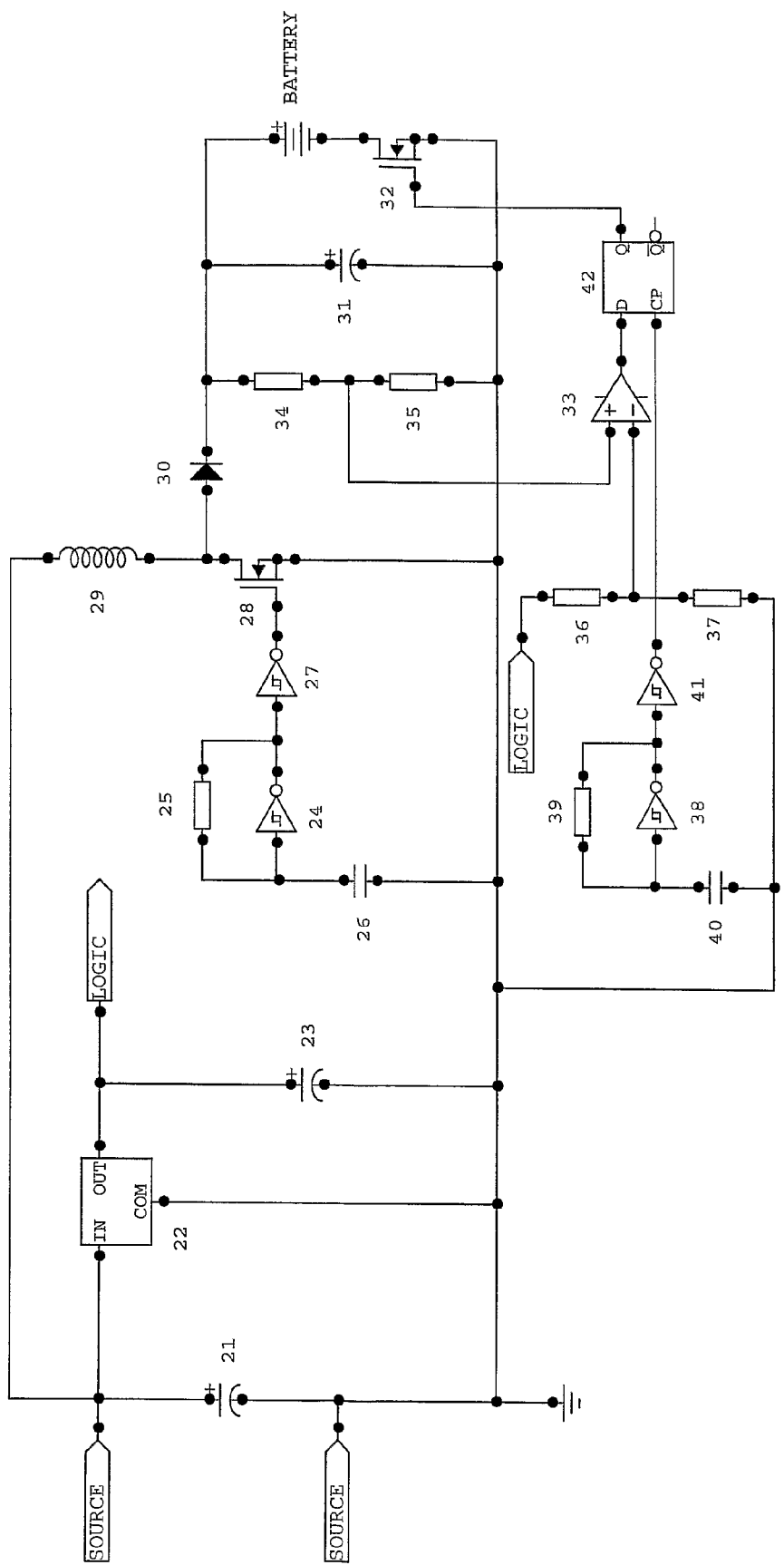
FIG. 2 is the full electronic diagram of a charger according to the invention, showing the high simplicity of implementing the invention.

FIG. 2 is the electronic schematic of a fully documented implementation of the invention supporting as a source:
- any type of battery within a voltage range from 5.6 volt up to more than 12 volt, or
- any type of mains "adapter" (rectifier)—possibly unfiltered—within the same voltage range, or
- any photovoltaic panel experiencing voltage variation within the same range, with the sole limit of providing enough power to supply the control logic parts.

The rough filtering block comprises an only one low voltage capacitor (21); the only constraint is to filter source disturbances too short to be absorbed by the control logic or the DC/DC converting stage.

The voltage stabilizing block uses an integrated, serial regulator (22) of known type and a filter capacitor (23) so as to provide a stable 5 volt to the control logic parts, which are specified for this voltage (named HCMOS and TTL technologies).

Such filtering and supply blocks are fully known and play only a utility role in the invention.

The DC/DC converter and step-charging stage is built from:
- a "RC" oscillator based on a "Schmidt trigger" type inverter (24) providing a symmetric clock signal output which frequency is set by the resistor (25) and the capacitor (26),
- an inverter (27) playing the role of a buffer for the said clock signal and controlling a MOSFET type switching transistor (28),
- an inductive coil (29) that reacts under high voltage pulses form to the primary current cut-off by the transistor (28),
- a protection and rectifying diode (30) that step charges the storage capacitor (31) from the said high voltage pulses.

Generating high voltage pulses by reaction to current cut-off within an inductive coil is in itself a well known technique.

With the parts as in the thereafter list, the clock frequency is nearly 65 kHz (not critical) and the voltage over the storage capacitor (31) would reach more than 150 volt if it were not timely discharged into the battery under control of the comparator stage that triggers the MOSFET type transistor (32) acting as a switch.

The comparator stage comprises a differential amplifier (33); the comparator inputs are polarized respectively:
- by the divider bridge made of the resistors (34) and (35), reflecting the voltage over the storage capacitor (31) terminals,
- by the equal resistors (36) and (37) acting as a divider by half of the logic supply, that is 2.5 volt.

The values if the (34) and (35) resistors are so chosen as to:
- ensure that the voltage into the (33) amplifier does not exceed the supply voltage of this amplifier (which could damage it), and
- provide a voltage slightly greater than the 2.5 volt reference voltage when the voltage over the storage capacitor terminal exceeds a predetermined, triggering threshold.

As an example a triggering threshold of roughly 25 volt has been found empirically convenient for charging a 12 volt nominal lead/acid battery.

The control pulse for the discharge switching transistor (32) is generated by means of another "RC" symmetrical, sampling clock generated by a "Schmidt-trigger" inverter (38); its frequency is set by the resistor (39) end the capacitor (40). This clock signal is buffered by the inverter (41).

When the comparator (33) detects a voltage exceeding the predetermined voltage threshold for discharge, a half period of the latter clock is locked by means of the "D" type flip-flop (42); its "Q" output triggers on the transistor (32).

Using the chosen parts the trigger clock has roughly a 1 kHz frequency and therefore a half-period of 500 µs (not critical) empirically found long enough to secure the discharge of the storage capacitor down to the instant battery voltage.

Figure 3:
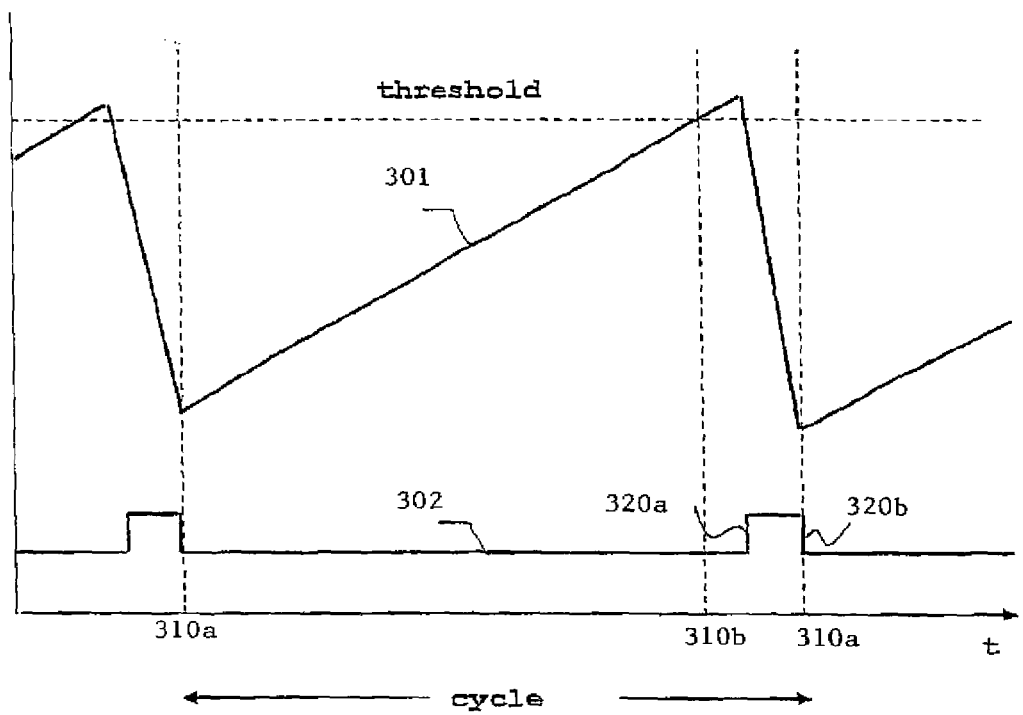
FIG. 3 is a timing diagram explaining the mechanism that allows the charger to self-adapt to the source fluctuations.

The thereafter list names all electronic parts used for the example implementation as described by the FIG. 3 schematic diagram.

A person skilled in the art will view those parts as commonplace, low cost and available from numerous sources:
- filter capacitor (21): 1000 µF 36 volt,
- logic voltage regulator (22): integrated 78L05 circuit,
- logic voltage filter capacitor (23): 100 µF 36 volt,
- induction coil (29): 50 µH,
- rectifying diode (30): 1N4007,
- storage capacitor (31): 100 µF 160 volt,
- "Schmidt trigger" inverters (24) (27) (38) and (41): four gates from an only one 74CH14 integrated circuit,
- step charging oscillator resistor (25) and capacitor (26): 2.2 k ohm et 10 nF respectively,
- discharge pulse oscillator resistor (39) and capacitor (40): 10 k ohm and 100 nF respectively,
- differential amplifier/comparator: LM324 integrated circuit,
- "D" type flip/flop (42): 74HC175 integrated circuit,
- MOSFET power transistors (36) and (37): IRF740,
- trigger threshold divider resistors (34) and (35): 100 k ohm and 10 k ohm respectively,
- reference voltage divider resistors (36) and (37): both 10 k ohm.

The charger behaviour shall be described based on the FIG. 3 timing diagram, which shows a full cycle of operation.

On this timing diagram the horizontal coordinate is time, and the vertical, voltage coordinate shows two signals:
- the voltage (301) over the storage capacitor (31) terminals,
- the discharge trigger control signal (302) coming from the "D" flip/flop (43).

According to a non periodic cycle that begins after a capacitor discharge (time 310a), this storage capacitor is step charged in ramp shape until the variable time (310b) when the voltage exceeds the predetermined threshold (303).

This event is detected by the comparator, resulting into a transistor control pulse of fixed time (320a) to (320b) allowing the capacitor discharge; this is the end of the cycle and the start of a new cycle.

The step charge duration (310a) to (310b) depends on the instant power available from the source. This is because the high voltage pulses generating process yields a voltage that depends directly on the intensity of the current cut off according to the well known formula $dU=L \times dI/dt$. Therefore the time to charge the storage capacitor up to the threshold is directly related to the available source current.

In case the source is a photovoltaic cells panel exposed to the sun light, it is known that this panel behaves as a "current source" roughly proportional to the incoming light flow. Therefore the time to charge the storage capacitor will in turn be variable and essentially proportional to the said light flow at the moment.

Conversely, the discharge pulse duration and amplitude shall remain substantially stable. The maximum voltage over the storage capacitor is slightly variable, the only uncertainty factor being the sampling clock period.

Therefore the objectives are met:
- on the one hand, self adaptation to the power available from a direct current source submitted to large fluctuations,
- on the other hand, a stable and insensitive to the source fluctuations quality of charge thanks to almost constant calibration of the discharge pulses.

This results from the invention characteristic combination of:
- a stage of voltage step up for step charging a storage capacitor,
- a comparator stage designed for triggering the said capacitor discharge into a battery when the voltage over the capacitor terminal exceeds a threshold predetermined as a function of the battery type.

The charger described as an example in FIG. 2 performs charging of a nominal 12 volt lead/acid battery from a solar panel source so designed as to deliver 14 volt under best light condition, as soon as this source generates some 5.6 volt, that is, enough to activate the control logic through the regulator.

Depending on the lighting condition, full charge of the battery is attained in a global delay adapting itself to the light flow fluctuations, including under such conditions that would block existing chargers due to "insufficient" voltage over the solar source terminals and therefore would waste a significant amount of the available energy.

It is feasible as well to deliberately <<undersize>> the photovoltaic source power (which cost per watt remains high) when much time is known to be available for charging a given battery, as in the case of sunny countries where sun light will be present all day long so as to provide night lighting from the battery.

Figure 4:
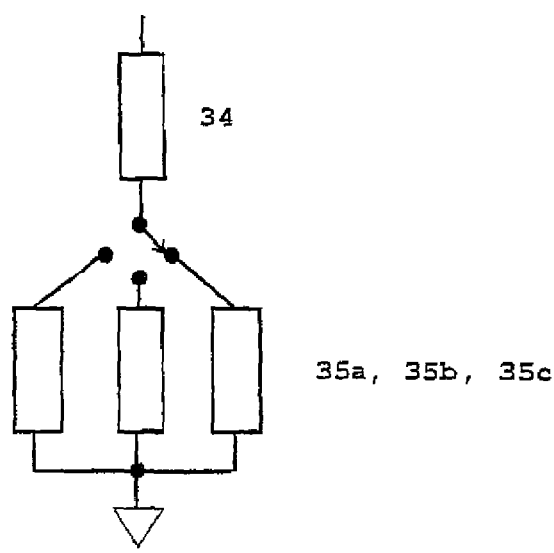
FIG. 4 is a variation of the FIG. 2 diagram showing how switching an only one resistor allows to determine the threshold of discharging the capacitor depending on the battery type.

If desirable, charging various types of batteries of different technology or of different nominal voltage may be obtained through a slight change of the FIG. 2 diagram, introducing as in FIG. 4 an additional switch for selecting various threshold voltages by means of inserting in the divider bridge one of the resistors (35a) (35b) (35c) etc. as a function of either foreseen battery type or model.

According to this variation the same charger is able to indifferently charging lead/acid, nickel cadmium of NiMH technology batteries etc. with various nominal voltages. Most existing chargers do not exhibit such a flexibility because they are designed for a given battery type and a given nominal voltage.

People skilled in the art will notice evidence that sizing chargers in accordance with the invention only depends on properly sizing the following parts:
   the filtering and storage capacitors,
   the switching transistors (or parallel setup of such transistors),
   the induction coil,
though not having to question the control logic, which own power consumption will become more and more insignificant with overall power increase.

People skilled in the art may also add without questioning the domain of the invention various known features such as:
   a charge limiter causing source disconnection based on the battery voltage,
   thermal protection,
   state of charge display, etc.

People skilled in the art will see as well that a load can be hooked on the battery terminals provided known safety features are used, without questioning the charger operation.

At last, people skilled in the art will consider such low voltage logic parts as from the 3.3 volt standard for controls, since the lowest operation point only depends of having enough power to run the control logic. In case the source is photovoltaic, this allows battery charging from even lower light flow.

The said control logic may obviously be implemented for large series within a single, dedicated circuit integrating clocks generation and the functionality of comparing the voltage over the storage capacitor terminals with a predetermined (or switch chosen) threshold.

The invention claimed is:

1. A method for charging a battery from a direct-current source liable to significant fluctuations, comprising the repetitive steps of:
   converting the DC voltage from said direct-current source into a DC voltage which is higher than the voltage of said battery,
   applying said higher DC voltage to the terminals of a storage capacitor, so as to transfer energy into said storage capacitor,
   detecting a predetermined voltage threshold over the terminals of said storage capacitor, and
   upon detection of said voltage threshold, connecting said storage capacitor to said battery during a predetermined time, so as to transfer energy of a discharge pulse with predetermined energy from said storage capacitor into said battery.

2. The method of claim 1, implemented for charging a battery from a photovoltaic cells source.

3. The method of claim 1, implemented for electrically supplying a lighting equipment for a vehicle, from a bicycle dynamo-electric generator.

4. A device for charging a battery from a direct-current source liable to significant fluctuations, implementing the method according to any of preceding claims, comprising:
   means for storing capacitive energy,
   means for converting the DC voltage from said direct-current source into a DC voltage which is higher than the voltage of said battery,
   means for applying said higher DC voltage to the terminals of said capacitive storage means, so as to transfer energy from said converting means into said capacitive storage means,
   means for detecting a predetermined voltage threshold over the terminals of said capacitive storage means, and
   means for connecting said capacitive storage means to said battery during a predetermined time, so as to transfer energy of a discharge pulse with predetermined energy from said capacitive storage means to said battery, said connecting means being controlled by said threshold detection means.

5. The device of claim 4, characterized in that it further comprises filtering means (11) arranged between said direct-current source and said progressively-charging means (13).

6. The device according to claim 4, characterized in that it further comprises means for adapting the predetermined voltage threshold at the terminals of said capacitive storage means (14), in function of the type of battery to be charged.

7. The device according to claim 5, characterized in that it further comprises means for adapting the predetermined voltage threshold at the terminals of said capacitive storage means (14), in function of the type of battery to be charged.

8. The device according to claim 6, characterized in that the threshold-adapting means comprise a commutable resistor (35a, 35b, 35c).

9. The device according to claim 7, characterized in that the threshold-adapting means comprise a commutable resistor (35a, 35b, 35c).

10. The device of claim 4, characterized in that the progressively-charging means (13) comprise inductive storage means (29) cooperating with controlled switching means (28).

\* \* \* \* \*